March 13, 1951 E. MONSERRAT 2,545,103
DISPLAY APPARATUS
Filed May 5, 1949 5 Sheets-Sheet 1
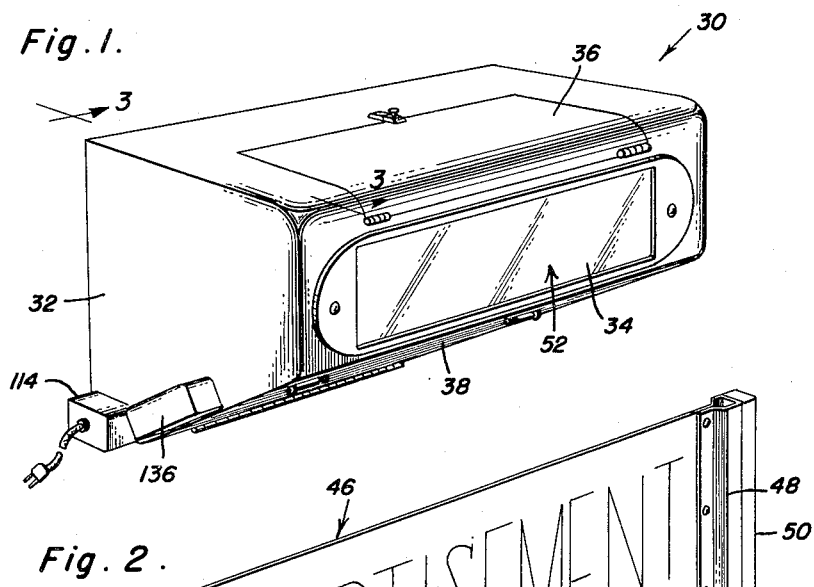
Fig. 1.
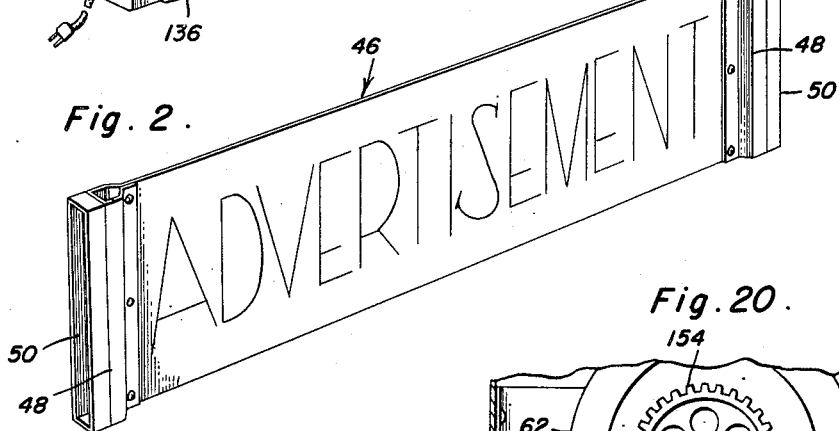
Fig. 2.
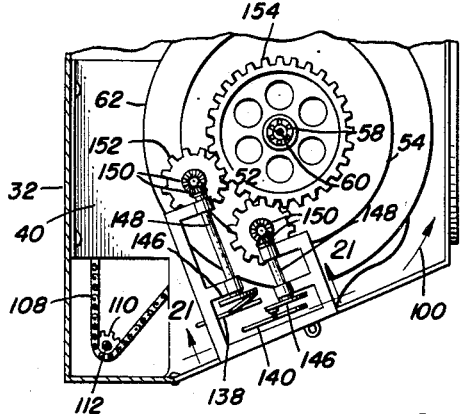
Fig. 20.
Fig. 21.
Inventor
Enrique Monserrat
By Clarence A. O'Brien
and Harvey B. Jacobson
Attorneys March 13, 1951     E. MONSERRAT     2,545,103
DISPLAY APPARATUS
Filed May 5, 1949                               5 Sheets-Sheet 2
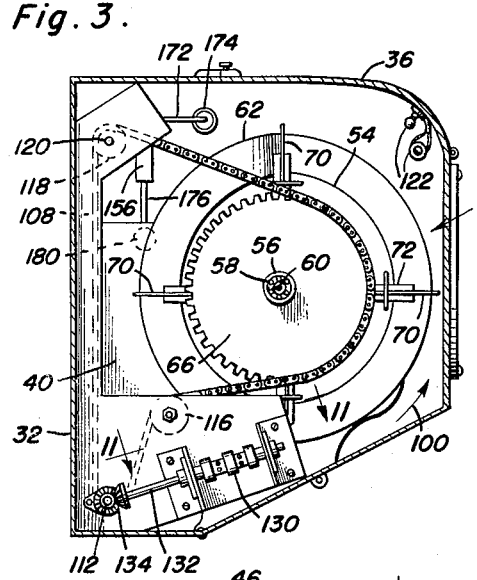
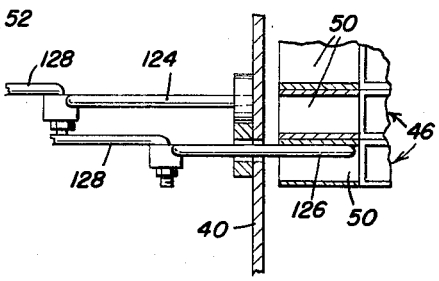
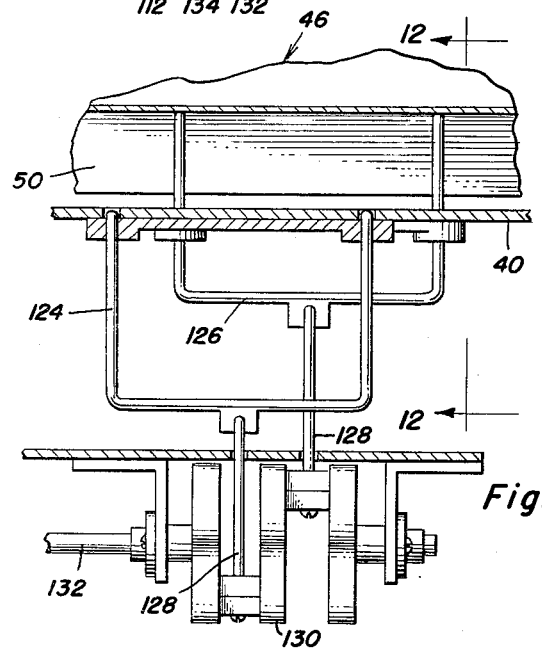
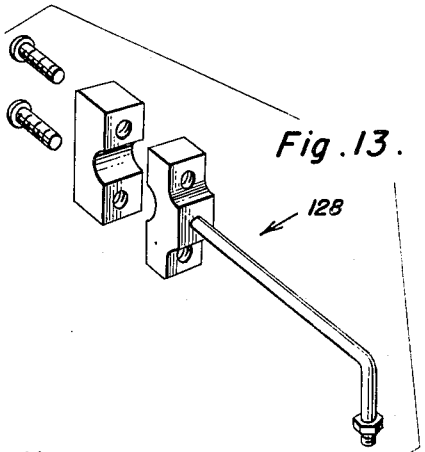
Inventor
Enrique Monserrat
By *Clarence A. O'Brien and Harvey B. Jacobson*
Attorneys March 13, 1951  E. MONSERRAT  2,545,103
DISPLAY APPARATUS
Filed May 5, 1949  5 Sheets-Sheet 3

Inventor
Enrique Monserrat

By Clarence A. O'Brien
and Harvey B. Jacobson
Attorneys

March 13, 1951 E. MONSERRAT 2,545,103
DISPLAY APPARATUS
Filed May 5, 1949 5 Sheets-Sheet 4
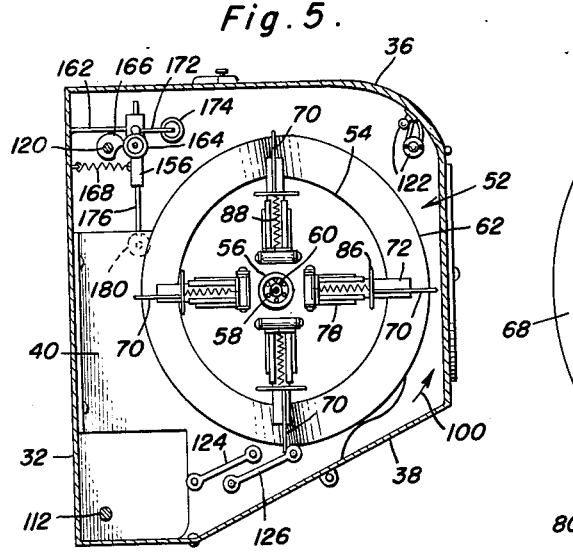
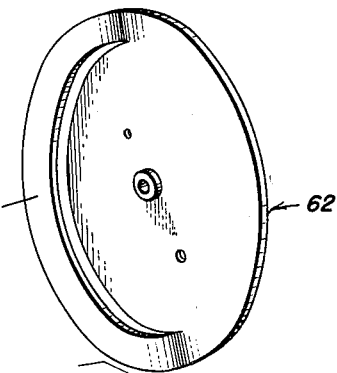
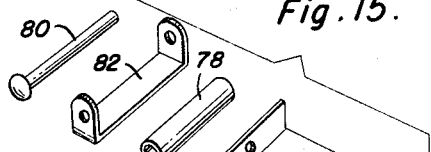
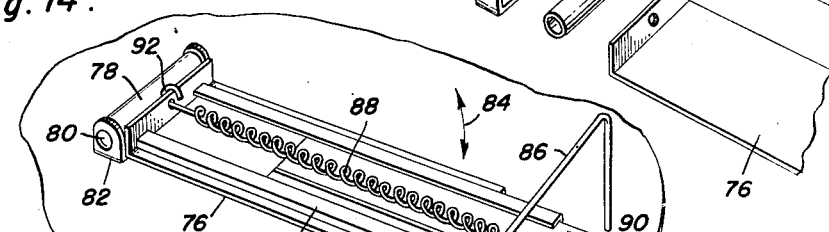
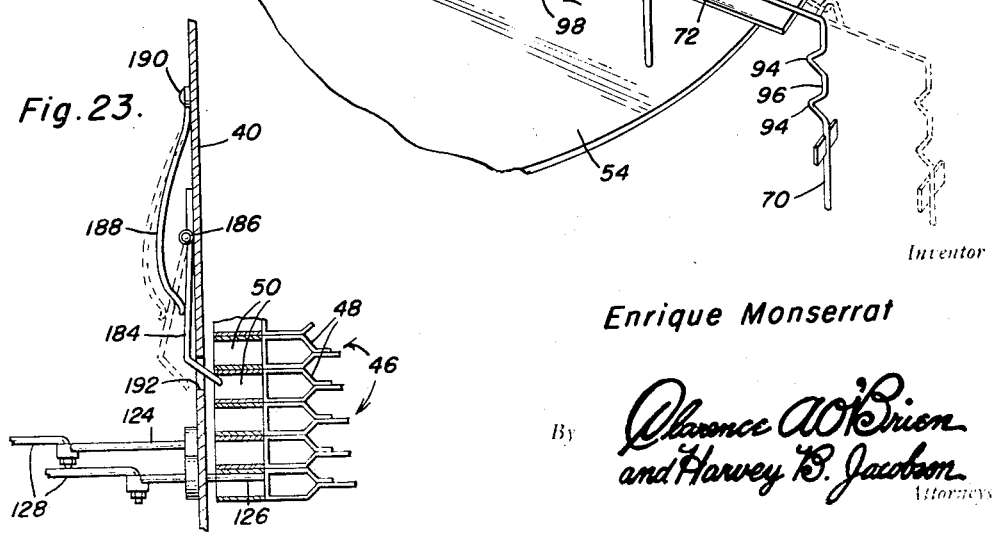
Inventor
Enrique Monserrat
By Clarence A. O'Brien
and Harvey B. Jacobson
Attorneys March 13, 1951  E. MONSERRAT  2,545,103
DISPLAY APPARATUS
Filed May 5, 1949  5 Sheets-Sheet 5
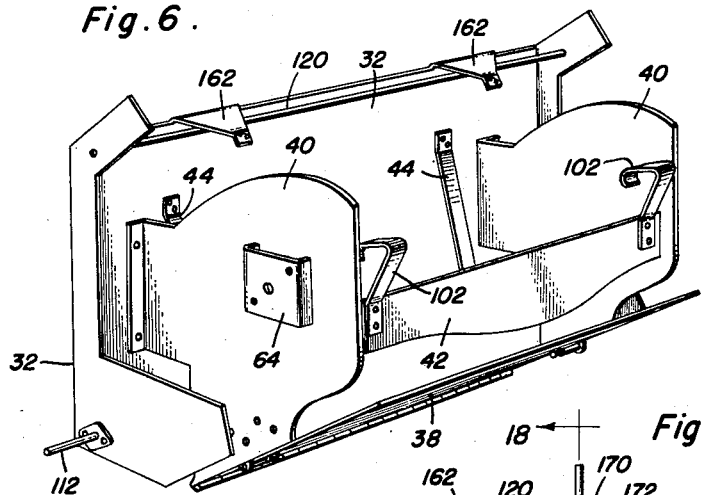
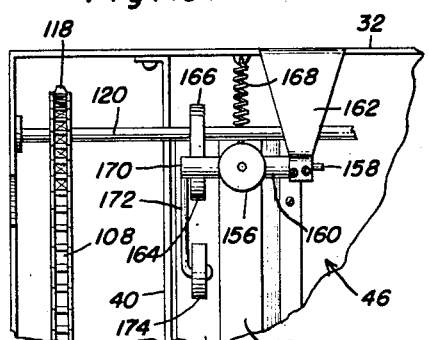
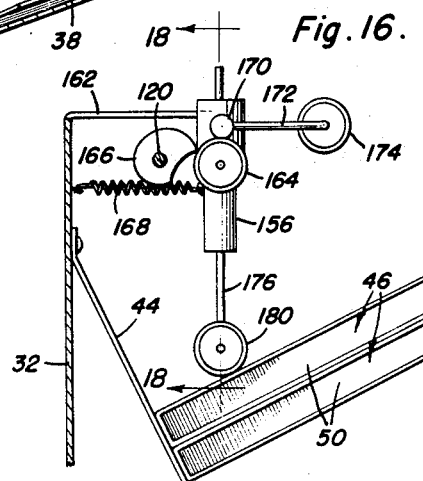
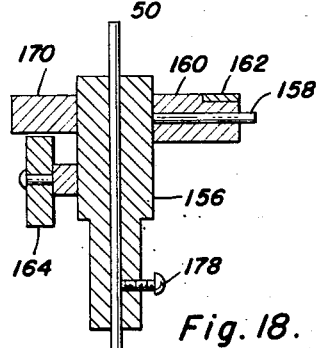
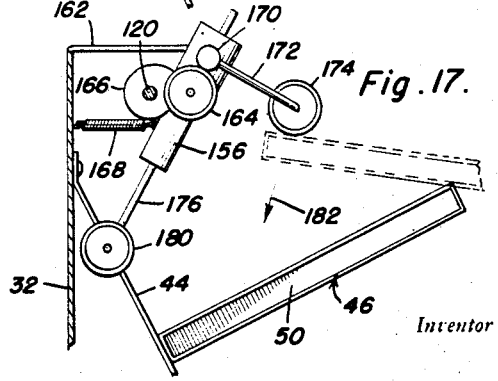
Inventor
Enrique Monserrat Patented Mar. 13, 1951

2,545,103

UNITED STATES PATENT OFFICE 2,545,103

DISPLAY APPARATUS

Enrique Monserrat, Manila, P. I.

Application May 5, 1949, Serial No. 91,495

8 Claims. (Cl. 40—36)

This invention relates to new and useful improvements and structural refinements in display apparatus, and in particular the invention concerns itself with an apparatus for displaying commercial advertisements provided on a plurality of individual display panels which are successively exhibited in a sight opening or window so as to attract the attention of potential observers and to successively convey to them a series of advertising messages. Although the invention is primarily intended for commercial advertising purposes, it will become obvious that it may be employed in other similar fields, such as for example, as an entertainment or educational appliance capable of bringing a succession of photographs or pictures before the eyes of students or the like.

An important feature of the invention therefore resides in the provision of the instant apparatus which utilizes a plurality of individual display panels nested one upon another in a stack and having display material provided on upper as well as lower surfaces thereof, together with means for individually and successively conveying panels from the bottom of the stack to an exhibiting station and thereafter depositing the exhibited panels at the top of the stack in an inverted position, so that both surfaces of the panels are exhibited in alternate succession.

The invention is adapted to be used while being stationarily mounted as well as while being secured to a vehicle, such as for example, an automobile, and since in the latter instance the apparatus may be subjected to considerable vibration, the invention contemplates the provision of means for supporting, stabilizing, guiding and otherwise controlling the movement of the panels, whereby the entire assembly is well adapted to withstand hard and severe usage to which it may be subjected.

Some of the advantages of the invention reside in its simplicity of construction, in its fully automatic operation, in its pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a perspective view of one of the display panels used in the invention;

Figure 3 is a cross-sectional view, taken substantially in the plane of the line 3—3 in Figure 1;

Figure 5 is a cross-sectional view, taken substantially in the plane of the line 5—5 in Figure 4;

Figure 6 is a perspective view of the frame and housing used in the invention;

Figure 7 is a perspective view of one of the cam members used in the invention;

Figure 11 is a cross-sectional detail, taken substantially in the plane of the line 11—11 in Figure 3;

Figure 12 is a fragmentary cross-sectional view, taken substantially in the plane of the line 12—12 in Figure 11;

Figure 13 is a group perspective view of one of the connecting rods illustrated in Figures 11 and 12;

Figure 14 is a fragmentary perspective view illustrating the arrangement of one of the fingers;

Figure 15 is a group perspective view showing the mounting of one of the finger-supporting guides;

Figure 16 is a fragmentary side elevational view of the panel-controlling and stabilizing means used in the apparatus;

Figure 17 is a fragmentary elevational view, similar to that shown in Figure 16, but illustrating the controlling and stabilizing means in a relatively different position;

Figure 18 is a cross-sectional detail, taken substantially in the plane of the line 18—18 in Figure 16;

Figure 19 is a fragmentary top plan view of the subject shown in Figures 16 and 17:

Figure 20 is a fragmentary cross-sectional view similar to that illustrated in Figure 3, but showing a modified embodiment of the invention;

Figure 21 is a fragmentary cross-sectional detail, taken substantially in the plane of the line 21—21 in Figure 20;

Figure 23 is a cross-sectional detail, taken substantially in the plane of the line 23—23 in Figure 22.

Like characters of reference are employed to designate like parts in the specification and throughout the several views.

Figure 4:
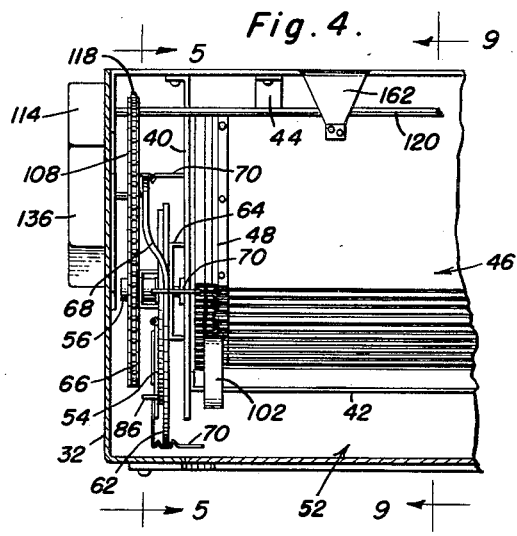
Figure 4 is a fragmentary cross-sectional view, taken in a substantially hrizontal plane through the assembly illustrated in Figure 3.

Referring now to the accompanying drawings in detail, the invention consists of a display apparatus designated generally by the reference character 30, the same embodying in its construction a horizontally elongated housing 32 provided in one side thereof with a sight opening or window 34 while the top of the housing is equipped with a suitable door 36 through which access to the interior may be had for purposes of inspection or repair. Moreover, a service door 38 is provided on the slanting bottom of the housing, for the purpose of facilitating the insertion and removal of the display panels when the advertising material is to be changed.

A frame consisting of a pair of spaced side plates 40 and a connecting cross member 42 is disposed in the housing 32, the side plates 40 of the frame being rigidly secured to the housing, as is best shown in Figure 6.

A pair of downwardly and forwardly extending support straps 44 are secured to the rear wall of the housing 32 and provide guides or rests for a stack of individual display panels designated generally by the reference characters 46, these panels being nested one upon another while "leaning" against the straps 44 and the bottom of the stack being supported in a manner hereinafter to be described.

Figure 10:
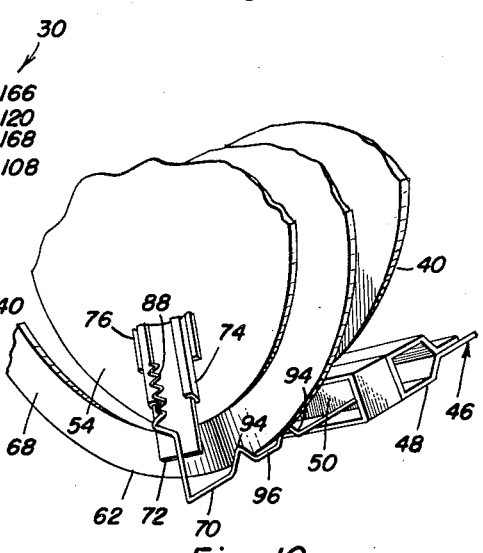
Figure 10 is a fragmentary perspective view showing one of the cam members, panel actuating fingers and panels.

Each of these panels simply consists of a flat sheet of suitable material provided with advertising matter on both sides thereof while its end portions are angulated and doubled upon themselves as at 48, so that box-shaped channels may be secured to these angulated and doubled end portions, the channels, in turn, providing elongated recesses 50 which extend transversely of the panels and have open outer sides but closed ends, as is best shown in Figures 2 and 10.

The interior of the apparatus housing immediately behind the sight opening or window 34 may be described as an exhibiting station for the display panels 46, this station being designated by the reference character 52. The apparatus is so arranged that panels are individually and successively conveyed from the bottom of the stack to this exhibiting station, where they momentarily come to rest so that they may be properly observed, after which these panels are deposited at the top of the stack in an inverted position and gravitate to the bottom of the stack to complete the cycle of operation. However, during the next cycle of operation each panel is in an inverted position and when it ultimately arises to the exhibiting station, the second side of the panel is exposed in the window 34, this arrangement permitting the use of both sides of the panel for advertising purposes, as aforesaid.

Means are provided, of course, not only for conveying the panels from the stack to the inspection station and back to the stack, but also for controlling, guiding and stabilizing the movement of the panels, these several means being provided in the form of two duplicate groups, each group being disposed in one end portion of the housing 32, that is, in a close proximity to one of the frame end members or pieces 40. Inasmuch as the two groups of mechanisms are similar in construction, it is believed that a description of one will suffice for both.

Figure 8:
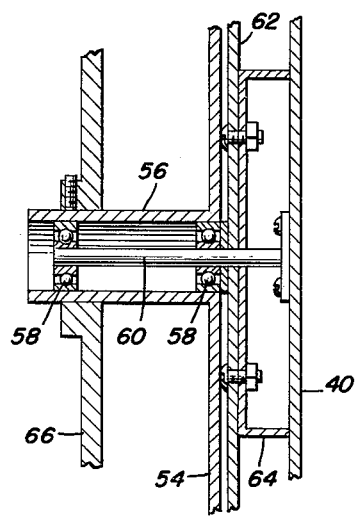
Figure 8 is a fragmentary cross-sectional detail illustrating the attachment of the cam member to the frame.

The means for conveying the panels will first be described, these involving the provision of a pair of rotary carriers, assuming the form of circular disks 54 provided with tubular extensions or bosses 56 containing a plurality of anti-friction bearings 58 (see Figure 8) whereby the carriers are rotatably mounted on axially aligned stub shafts 60 secured to the aforementioned side pieces or members 40 of the frame. Each of the carrier disks 54 is disposed immediately adjacent a stationary cam member 62 secured to the adjacent end plate 40 by means of a suitable bracket 64, and a driving sprocket 66 is secured to the extension or boss of both the carrier disks 54, substantially as shown.

It is to be noted that the cam members 62 are secured to their brackets 64 eccentrically relative to the axis of rotation of the carrier disks 54, and in addition, the cam members are provided with laterally offset marginal edge portions 68, as is best shown in Figure 7. A plurality of wire fingers 70 are provided on each of the carrier disks 54, each of these fingers having an angulated portion which is rigidly secured by welding, or the like, to a plate or strip 72 slidable in a guide 74 which, in turn, is secured to a supporting plate 76 (see Figure 14), a plurality of the fingers 70 being associated with each of the carrier disks 54 and the supporting plates 76 being disposed radially on each disk, substantially as shown. The inner ends of the plates 76 are secured to tubular bearings 78 which, in turn, are swingably mounted upon suitable pins 80 secured in double angle brackets 82, these brackets being secured rigidly to the carrier disks 54. It is to be noted that by virtue of this arrangement, the plates 76 together with the guides 74 and slidable strips 72 are swingable toward and away from the disks 54 as indicated at 84, the outward swinging of the finger assemblies being restricted by U-shaped yokes 86 secured to the carrier disks and straddling the strips 72, as is best shown in Figure 14. In addition, the strips 72 together with the fingers 70 are slidable radially relative to the disks 54, this being effected, of course, by the slidable disposition of the strips 72 and the guides 74. However, suitable tension springs 88 are provided for urging the fingers 70 inwardly, that is, toward the center of the disks 54, the springs 88 being attached at one end to the fingers 70 as at 90, while the inner ends of the springs are secured to the plates 76 as at 92 (see Figure 14).

The free end portions of the fingers 70 are angulated as at 94 so as to provide an intermediate groove or channel 96 which is engageable with the periphery of the cam members 62, including the laterally offset peripheral portion 68, so that as the carrier disks 54 rotate on the stub shafts 60, the fingers 70 are subjected to movement in three directions, that is, a rotary movement about the axis of the shafts 60, a radial sliding movement in the direction of the arrow 98 (see Figure 14) as created by the eccentric disposition of the cam members 62 relative to the shaft 60, and finally, an inward and outward movement indicated at 84 in Figure 14, as prompted by the engagement of the finger grooves 96 with the laterally offset peripheral portion 68 of the cam members.

It should be explained at this point that the fingers 70 are receivable in the recesses 50 at the ends of the panels 46, the structure being so arranged that as the carrier disks 54 rotate in the direction of the arrow 100, a pair of the fingers is brought into engagement with the recesses 50 of the lowermost panel in the stack and the panel is withdrawn from the bottom of the stack and is delivered to the exhibiting station 52. At that point the entire mechanism comes to rest, so that the exhibited panel may be effectively observed, after which operation of the apparatus is resumed and the exhibited panel is delivered to and deposited on the top of the stack in an inverted position, as will be clearly apparent from the accompanying Figure 9. While the panel is being thus conveyed, that is, from the bottom of the stack to the exhibiting station and to the top of the sack, the grooves 96 of the fingers 70 employed for motivating the panel engage the normal peripheral portion of the cam members 62, but when the panel is to be discharged on top of the stack, the grooves 96 of the fingers ride on the laterally offset portions 68 of the cam members, thus urging the fingers outwardly from the recesses 50 and permitting the exhibited panel to drop on top of the stack. As the rotation of the carrier disks 54 continues, the grooves 96 of the same fingers eventually ride off the laterally offset portion 68 of the cam members 62, at which point the free ends of the fingers are again engaged with the recesses 50 of the lowermost panel in the stack, thus repeating the cycle.

Figure 9:
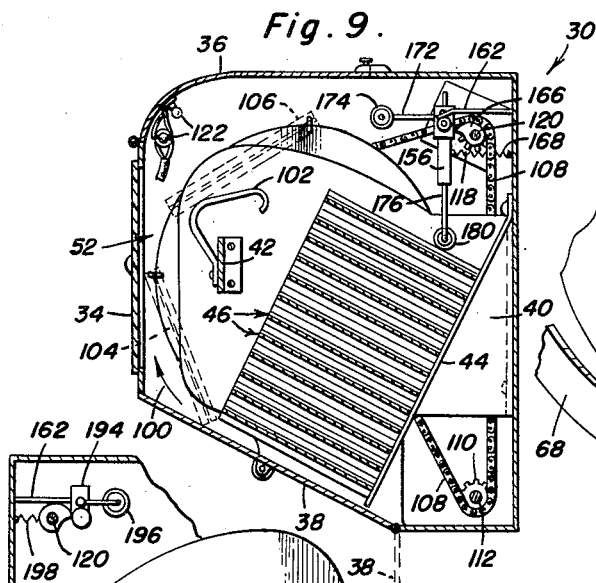
Figure 9 is a cross-sectional view, taken substantially in the plane of the line 9—9 in Figure 4.

It is to be noted that suitable guides 102 are secured to the cross piece 42 of the mechanism frame immediately behind the exhibiting station 52, which guides effectively support the exhibited panels while being conveyed from the exhibiting station 52 to the top of the stack, as illustrated in Figure 9. It may be also noted in this connection that the exhibiting station 52 is disposed at a greater radial distance from the axis of rotation of the carrier disks 54 as compared to the location of the stack of panels, this being necessary to provide sufficient clearance for the panels as they travel from the bottom of the stack to the exhibiting station and from the latter to the top of the stack. The fingers 70 effectively compensate for this increased radial distance by sliding, with the strips 72, in the guides 74, but the springs 88, of course, tend to draw the fingers 70 toward the center of the disks 54, thus effectively maintaining the grooves 96 of the fingers in engagement with the periphery of the cam members 62, as will be clearly apparent.

It has been already stated that a plurality of the fingers 70 are associated with each of the disks 54, the preferred number of fingers on each disk being four, whereby one pair of fingers (on the two disks) may be engaged in conveying the lowermost panel from the stack to the exhibiting station, another pair of fingers may be engaged in delivering another, already exhibited panel from the station 52 to the top of the stack, while a third pair of fingers has just completed delivering a previously exhibited panel to the top of the stack, and finally, while a fourth pair of fingers is in readiness to pick up the next panel from the bottom of the stack for delivery to the exhibiting station. This sequence of operation can be readily observed in Figure 9, wherein the reference character 104 indicates a panel en route to the exhibiting station, while 106 similarly indicates an exhibited panel en route to the top of the stack.

The sprockets 66 associated with the bosses 56 of the two carrier disks 54 are rotated by chain drives 108 engaging relatively smaller sprockets 110 secured to a common drive shaft 112 which extends longitudinally in the lower portion of the housing 32 and is operatively connected at one end thereof to a combined motor and timing mechanism 114 disposed exteriorly at one end of the housing, as illustrated in Figure 1. This mechanism simply consists of an electric motor and a mechanical or electrical device of any conventional type for periodically interrupting the operation of the motor, so that all the apparatus within the housing is periodically brought to rest each time one of the panels 46 is exhibited in the sight opening or window 34, so that the advertising material on the panel may be perused by observers.

It is to be noted that the drive chains 108 pass over suitable idler sprockets 116 provided in the bottom portion of the housing, and that the drive chains also engage additional sprockets 118 secured to a countershaft 120 rotatably journaled in the upper portion of the housing, as is best shown in Figures 3, 6 and 9. The purpose of this countershaft will be hereinafter more fully described.

It may be explained at this point that a plurality of electric lamps 122 are provided in the housing 32 for the purpose of illuminating the panels in the exhibiting station 52, the lamps 122, of course, receiving their supply of current independently of the driving motor so that the lamps remain energized even though the apparatus is not in motion when each panel is being exhibited.

The apparatus includes in its construction means for supporting the panels 46 in their stack in such manner that the lowermost panel may be easily withdrawn for conveyance to the exhibiting station, said means being best illustrated in the accompanying Figures 11, 12 and 13 and embodying in its construction a pair of projectable and retractable keeper forks 124, 126 which are slidable through the side members 40 of the frame in and out of the recesses 50 of the next lowermost and lowermost panels, respectively, in the stack.

The keeper forks 124, 126 are operatively connected by means of the connecting rods 128 to diametrically opposite "throws" or "cranks" of a crankshaft assembly 130 provided on a shaft 132 which is rotatably journaled in the housing 32 and is operatively connected by a bevel gear drive 134 to the aforementioned drive shaft 112 (see Figure 3).

The crankshaft assembly 130 is housed in a suitable casing 136 provided exteriorly on the housing 32 adjacent the motor and timer unit 114 (see Figures 1 and 4), and it will be apparent that as the shafts 112, 132 rotate the crankshaft assembly 130 will cause the keeper forks 124, 126 to alternately project into the recesses 50 of the respective next lowermost and lowermost panels in the stack. In other words, when the keeper fork 126 is projected into the recesses of the lowermost panel, the fork 124 is withdrawn so that the entire weight of the stack of panels is supported by the fork 126. However, as a pair of the fingers 70 are brought into engagement with the lowermost panel so as to withdraw the latter from the bottom of the stack and conveyed to the exhibiting station 52, the keeper forks 126 are gradually withdrawn from the recesses of the lowermost panel, while, at the same time, the keeper forks 124 are inserted into the recesses of the next lowermost panel, whereby the weight of the panels above the next lowermost panel in the stack is supported by the next panel, so that the withdrawal of the lowermost panel is facilitated. Subsequently, when the lowermost panel is withdrawn by the fingers 70, the keeper forks 124 are also withdrawn from the next lowermost panel so that the latter is permitted to drop by gravity to the lowermost position, in which it is engaged by the forks 126 as will be clearly apparent.

As an alternative form of construction, the keeper forks 124, 126 may be substituted by similar forks 138, 140, respectively, as illustrated in Figures 20, 21. The forks 138, 140 are connected by suitable connecting rods 142 to crank pins 144 provided in diametrically opposite relation on a pair of simultaneously rotatable disks 146. These disks are secured to independent but simultaneously rotatable shafts 148 which, in turn, are operatively connected through the medium of bevel gearing 150 and pinions 152 to a common drive gear 154 attached to the boss 56 of each of the carrier disks 54 immediately adjacent the aforementioned sprocket 66.

This alternative arrangement is structurally different but performs the same function as the arrangement disclosed in Figures 11, 12 and 13.

It may be explained at this point that the aforementioned idler sprockets 116 (see Figure 3) assure that the drive chain 108 does not interfere with the keeper fork mechanisms 124, 126 or 138, 140, as the case may be.

Means are provided in the apparatus for stabilizing and controlling the movement of the panels as they are deposited on top of the stack, which means are particularly useful when the invention is installed on a vehicle, or the like, and is thus subjected to considerable vibration which, if permitted to occur, may have a tendency to impair proper operation of the keeper fork mechanisms 124, 126 or 138, 140.

These last-mentioned means are best illustrated in the accompanying Figures 16-19 inclusively, involving the provision of a pair of arm-shaped members 156 which are provided with laterally projecting pivot pins 158 whereby they are swingably mounted in horizontal, tubular bearings 160, rigidly secured to suitable brackets 162 provided in the housing 32, as will be clearly apparent from the accompanying drawings.

The arms 156 are provided at the sides thereof with rotatable, disk-shaped or roller-shaped followers 164 which engage suitable cams 166 secured to the aforementioned counter-shaft 120. By virtue of these cams, the members 156 are swingable from the position shown in Figure 17 to that illustrated in Figure 16, but suitable tension springs 168 extend between the members 156 and the housing 32, whereby the members are urged to the position shown in Figure 17, as will be readily understood.

The members 156 are also provided with laterally projecting bosses 170 carrying forwardly projecting rods 172 which, in turn, carry rotatable rollers or ball bearings 174, these rollers being engageable with the end portions of the panels 46 when the members 156 are in the position shown in Figure 17. In addition, the members 156 are provided with adjustable extension rods 176 which are adjustably secured in the members by suitable set screws 178 (see Figure 18), the extension rods 176 having angulated outer end portions carrying rotatable rollers or ball bearings 180 which are engageable with the end portions of the panels 46 when the members 156 are in the position shown in Figure 16.

The cams 166, being secured to the counter-shaft 120, are so synchronized with the operation of the remaining mechanism that they cause the rollers 174 to engage the ends of a panel as it is being deposited on top of the stack as shown in Figure 17, thus effectively guiding and urging the panel to its deposited position on top of the stack, as indicated by the arrow 182. This urging and guiding action is performed, of course, by the resiliency of the tension springs 168, but after the panel has been deposited, the cams 166 swing the members 156 to the position shown in Figure 16, wherein the rollers 180 engage the uppermost panel in the stack and thus prevent the panels in the stack from vibrating or otherwise becoming displaced. Needless to say, the adjustment facilitated by the screws 178 may be varied, that is, the extension rods 176 may be slid upwardly or downwardly in the members 156, so that the rollers 180 may engage the uppermost panel in the stack regardless of the number of panels employed.

Figure 22:
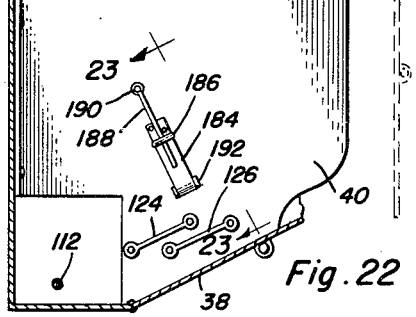
Figure 22 is a fragmentary cross-sectional view showing a still further modified embodiment of the invention.

To further assist in the guiding and stabilizing of the panels in the stack, an arrangement illustrated in the accompanying Figures 22, 23 may be employed, this arrangement involving the provision of projectable and retractable detent arms 184 which are pivotally or hingedly attached to the side members 40 of the frame, as at 186, together with arcuate leaf springs 188 which are secured as at 190 to the side members 40 and bear against the detent arms 184, so that free end portions of the latter extend through suitable openings 192 in the side members 40 to engage the recesses 50 of intermediate panels in the stack. In other words, the detent arms 184 stabilize the panels in the stack, but are retractable against the resiliency of the springs 188 when the panels progressively descend toward the bottom of the stack.

When this arrangement is employed, the extension rods 176 and rollers 180 on the guiding members 156 may be eliminated, so that the guiding members assume a relatively short form as indicated at 194 in Figure 22, but the members 194 are still provided with the panel engaging and guiding rollers 196 similar to the aforementioned rollers 174, and suitable tension springs 198 are employed for urging the rollers 196 in engagement with the ends of the panels while the latter are being deposited on the top of the stack, as in the previous instance.

It is believed that the advantages and use of the invention will be clearly apparent from the foregoing disclosure and accordingly, further decription thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a display apparatus, the combination of a plurality of individual display panels nested one upon another in a stack and having display material on upper and lower surfaces thereof, a pair of rotary carriers provided at the ends of said panels and including a set of conveying fingers which are movable in and out of engagement with the ends of said panels whereby the latter may be individually and successively conveyed from the bottom of the stack to an exhibiting station and thereafter deposited in an inverted position at the top of the stack, means for rotating said carriers, and a pair of stationary cam members mounted adjacent the respective carriers, said fingers being engageable with said cam members when the carriers are rotated, whereby to move the fingers in and out of engagement with said panels.

2. In a display apparatus, the combination of a frame, a plurality of individual display panels nested one upon another in a stack supported by said frame, said panels being provided at opposite ends thereof with finger receiving recesses, a pair of rotary carriers mounted on said frame at the ends of said panels and including a set of fingers which are movable in and out of said recesses whereby said panels may be individually and successively conveyed from the bottom of the stack to an exhibiting station and thereafter deposited in an inverted position at the top of the stack, means for rotating said carriers, a pair of stationary cam members each secured to said frame adjacent one of said carriers, said fingers engaging said cam members whereby they are moved in and out of said recesses in predetermined synchronization with the rotation of the carriers, projectable and retractable keepers slidable in said frame and receivable in the recesses of the next lowermost panel in the stack, said keepers being operatively connected to said carriers whereby they may supportably engage the next lowermost panel while the lowermost panel is being removed from the stack, and means provided in said frame for guiding said panels while in conveyance from the exhibiting station to the top of the stack.

3. The device as defined in Claim 2, together with additional projectable and retractable keepers slidable in said frame and receivable in the recesses of the lowermost panel in the stack, said last-mentioned keepers being operatively connected to said carriers and cooperating alternately with the first-mentioned keepers for supporting the superimposed panels.

4. The device as defined in claim 2 wherein a panel at the exhibiting station is disposed at a greater radial distance from said carrier than the panels in the stack, said carriers including means for facilitating radial sliding of said fingers toward and away from the exhibiting station.

5. The device as defined in claim 2, together with a housing provided on said frame and formed with a sight opening at the exhibiting station of said panels.

6. The device as defined in claim 2, together with means for controlling and stabilizing the exhibited panels during depositing thereof at the top of the stack, said last-mentioned means including a pair of arm-shaped panel engaging members swingably mounted on said frame adjacent the top of the stack of panels and operatively connected to said carriers.

7. The device as defined in claim 2, together with means for stabilizing said panels in the stack, said last-mentioned means including a set of resiliently actuated detents provided on said frame and receivable in the recesses of the stacked panels.

8. The device as defined in claim 2, wherein said cam members are substantially disk-shaped and are mounted eccentrically relative to the axis of rotation of said carriers, marginal edges of said cam members being provided with lateral offsets and being engaged by said fingers whereby the latter are movable radially and axially with the rotation of said carriers.

ENRIQUE MONSERRAT.

REFERENCES CITED

The following references are of record in the file of this patent:

UNITED STATES PATENTS

| Number | Name | Date |
| --- | --- | --- |
| 848,657 | Johnson et al. | Apr. 2, 1907 |
| 1,017,832 | Wessels | Feb. 20, 1912 |
| 1,842,422 | O'Shea | Jan. 26, 1932 |
| 2,029,653 | Chazan | Feb. 4, 1936 |

FOREIGN PATENTS

| Number | Country | Date |
| --- | --- | --- |
| 465,541 | Germany | Sept. 19, 1928 |